Feb. 25, 1958   M. S. SPARKS, JR., ET AL   2,824,968
ANALYZER

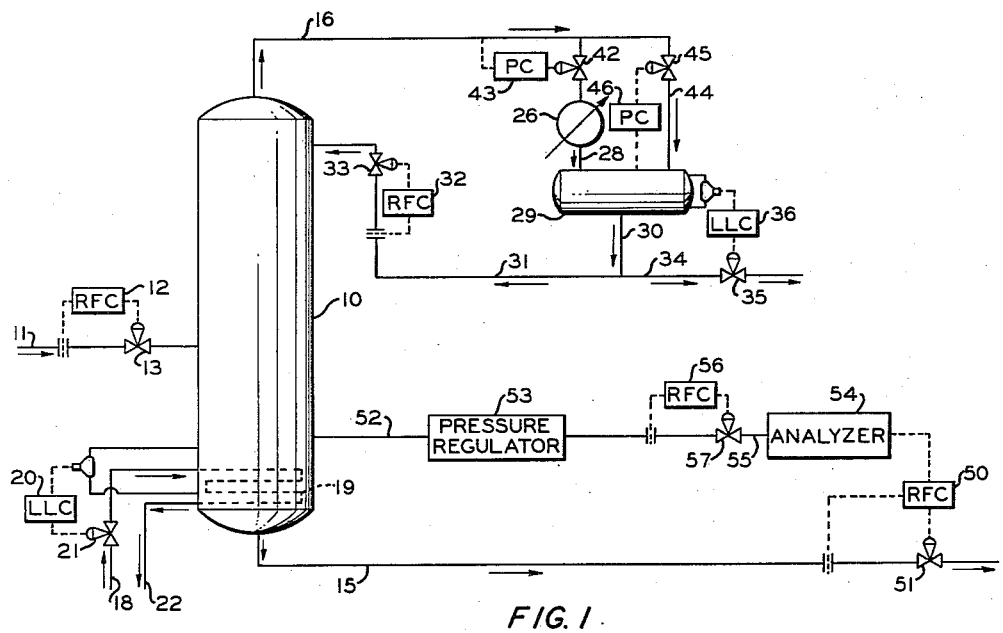
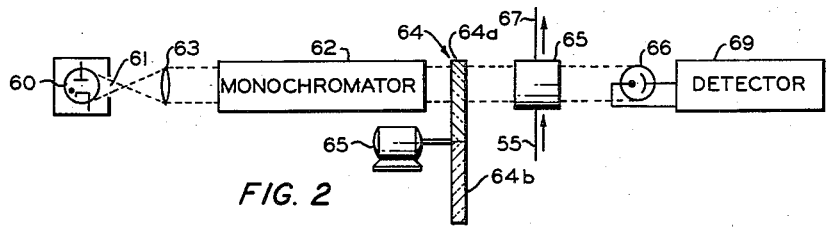
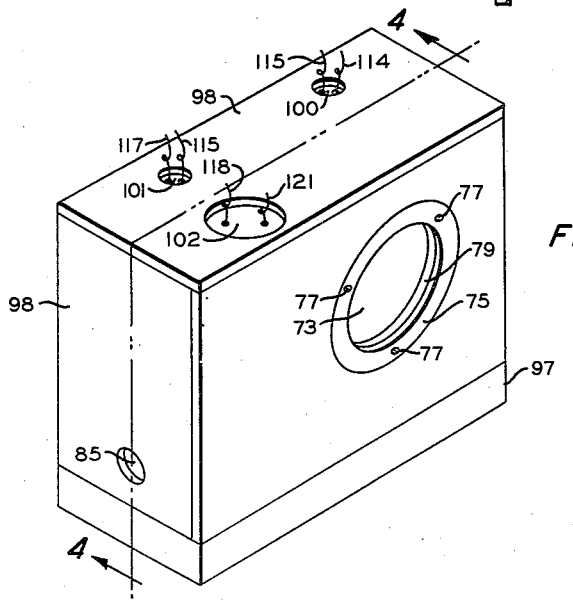

Filed May 9, 1955   2 Sheets-Sheet 2

INVENTORS.
M. S. SPARKS, JR.
M. E. REINECKE
BY
*Hudson & Young*
ATTORNEYS

United States Patent Office 2,824,968
Patented Feb. 25, 1958

2,824,968
ANALYZER

Marshall S. Sparks, Jr., and Marvin E. Reinecke, Bartlesville, Okla., assignors to Phillips Petroleum Company, a corporation of Delaware Application May 9, 1955, Serial No. 506,702

8 Claims. (Cl. 250—43.5)

This invention relates to the optical analysis of fluid streams. In another aspect it relates to improved means to supply a fluid stream to an analyzer at constant temperature and pressure.

Various types of optical analyzers have recently been developed for the analysis of fluid streams. Certain of these analyzers are based upon the known fact that some materials absorb electromagnetic radiation at wave lengths characteristic of the material. A vaporized sample of the material to be analyzed is directed continuously through a sample cell. A beam of radiation is directed through the cell and the transmitted radiation is measured to determine the concentration of a particular constituent in the sample stream which absorbs selected wave lengths of radiation. The accuracy of an analysis of this type depends upon circulating the sample stream at a constant rate through the optical cell. Furthermore, the temperature and pressure of the sample stream must be maintained constant because a change in either is likely to change the radiation absorption properties of the gas.

In accordance with the present invention improved apparatus is provided to supply a gas stream to an analyzer at constant temperature and pressure. The fluid stream to be analyzed is vaporized, if initially supplied as a liquid. The gas is passed through a pressure regulator and a flow controller to ensure both a constant temperature and a constant flow rate. The optical cell is formed of a block of heat conductive material. An elongated passage is formed in the block so that the gas sample acquires the temperature of the block before entering the chamber through which radiation is transmitted. First and second heating elements are positioned in the block in spaced relation with one another to supply necessary heat to maintain the temperature of the block constant at a desired value. These heating elements are energized in response to a thermostat which is positioned in closely spaced relationship with one of the heating elements. The heating element adjacent the thermostat supplies considerably less heat than does the other element. In this manner the thermostat is energized primarily by the heat supplied from the smaller element. This results in a more sensitive control than is possible with conventional thermostat means employing only a single heating element.

Accordingly, it is an object of this invention to provide an improved system to supply a fluid to an analyzer at a constant rate, temperature and pressure.

Another object is to provide improved apparatus to maintain an element at a constant temperature.

A further object is to provide improved optical analysis apparatus.

Other objects, advantages and features of the invention should become apparent from the following detailed description, taken in conjunction with the accompanying drawing, in which:

Figure 1 is a schematic representation of a fractionation control system employing an analyzer which incorporates features of this invention;

Figure 2 is a schematic representation of the optical analyzer employed in the control system of Figure 1;

Figure 3 is a perspective view of the sample cell of the analyzer of Figure 2;

Figure 4:
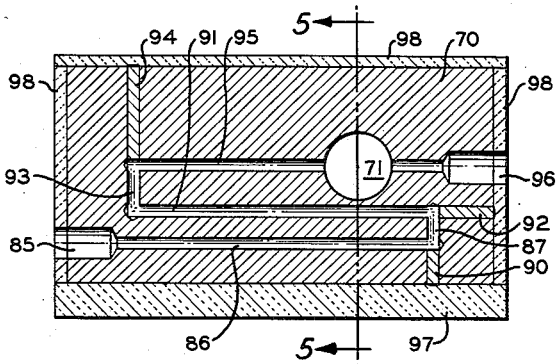
Figure 4 is a sectional view taken along line 4—4 in Figure 3.

In order to explain the need for and the operation of the present invention, reference will be made to a particular application of an ultraviolet analyzer employed to control the operation of a fractionation column. The fractionation column is provided to separate a fluid mixture of butadiene and butene-2.

Referring now to the drawing in detail and to Figure 1 in particular, there is shown a fractionation column 10 of any suitable design employing contacting means such as perforated plates, bubble decks or the like. The feed mixture to be separated is supplied to column 10 through a line 11 at a rate controlled by a conventional rate-of-flow controller 12 which adjusts a valve 13 in line 11. The feed mixture is separated within column 10 into a liquid kettle product which is withdrawn through a line 15 and a lower boiling overhead gaseous stream which is withdrawn through a line 16. Heat is supplied to the lower portion of column 10 through a steam line 18 which communicates with coils 19 disposed in the lower portion of column 10. The rate of addition of steam to coil 19 is controlled by a liquid level controller 20 which adjusts a valve 21 in line 18 in response to the liquid level in the lower portion of column 10. The spent steam is removed through a line 22.

The gases which comprise the relatively light components of the feed mixture that are not retained in the heavier reboiled bottoms fraction are directed from the upper portion of column 10 through line 16 to a condenser 26 wherein they are partially or completely condensed, as desired, and wherefrom the resulting condensate is directed through a line 28 to a reflux accumulator 29. The distillate collected in accumulator 29 is discharged through a line 30. A portion of this distillate is directed through a line 31 back into the upper portion of column 10 as reflux. A constant flow rate is maintained in line 31 by a rate-of-flow controller 32 which adjusts a valve 33 in line 31. The remainder of the distillate removed from accumulator 29 is directed through an overhead product line 34 at a rate which is proportional to the liquid level in accumulator 29. A valve 35 in line 34 is controlled by a liquid level controller 36 which is attached to accumulator 29. In order to maintain the desired operating pressure in column 10, a valve 42 is disposed in line 16 upstream from condenser 26. Valve 42 is adjusted by a pressure controller 43 which is actuated by the pressure in line 16. A line 44 is connected between accumulator 29 and line 16 upstream from valve 42. A valve 45 in line 44 is adjusted by a pressure controller 46 in response to the pressure in accumulator 29.

The fluid stream supplied to column 10 through line 11 comprises a mixture of butadiene and butene-2. The column is maintained at conditions of temperature and pressure such that the overhead product stream comprises primarily butadiene, whereas the kettle product stream comprises primarily butene-2. The withdrawal of kettle product through line 15 normally is regulated by a rate-of-flow controller 50 which adjusts a valve 51 in line 15. A sample stream is withdrawn continuously from the column through a line 52 which communicates with the inlet of a pressure regulator 53. The sample stream withdrawn from column 10 through line 52 normally is in vapor phase. If this sample stream were a liquid, suitable means would be provided in line 52 to vaporize the sample. The outlet of pressure regulator 53 communicates through a line 55 with the inlet of an analyzer 54. A constant flow through line 55 is maintained by a rate-of-flow controller 56 which adjusts a valve 57. Analyzer 54 is adapted to determine the concentration of butadiene in the sample stream. The output signal of analyzer 54 overrides the rate-of-flow controller 50 to maintain the concentration of butadiene in the sample stream at a constant preselected value. By maintaining the concentration of butadiene constant in the region of the column from which the sample stream is removed, the concentration of butadiene in the overhead product stream is also maintained within selected limits.

Analyzer 54 is illustrated schematically in Figure 2. Radiation in the ultraviolet spectrum is provided by a hydrogen discharge lamp 60. Radiation emitted from lamp 60 through an aperture 61 is directed through a monochromator 62 by a collimating lens 63. The radiation transmitted through monochromator 62 is directed through a disc 64 which is rotated by a motor 65. The radiation transmitted through disc 64 is directed through a sample cell 65 to impinge upon a detector 66. Sample line 55 communicates with the inlet of sample cell 65, and the gas is vented from cell 65 through a line 67. Butadiene absorbs radiation in the ultraviolet spectrum at approximately 2200 Angstrom units. Monochromator 62 is employed to limit the transmitted radiation to this general region. Disc 64 preferably is formed of two semicircular sectors constructed of quartz and Vycor, respectively. Quartz is transparent to radiation in the region of 2200 Angstrom units. Vycor, a glass containing approximately 96 percent silicon dioxide, is only partially transparent to wave lengths in this region. Thus, in the absence of butadiene in sample cell 65, the magnitude of radiation incident upon cell 66 increases and decreases periodically at the frequency at which disc 64 is rotated. A detecting circuit 69 is connected to cell 66 to measure the magnitude of this difference in amplitude of transmitted radiation. When butadiene is present in sample cell 65 the difference in amplitude of the two beams is decreased because butadiene absorbs radiation at approximately the same wave lengths of the radiation absorbed by the Vycor. This difference provides a measurement of the concentration of butadiene in sample cell 65.

Figure 5:
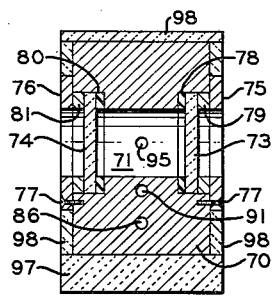
Figure 5 is a sectional view taken along line 5—5 in Figure 4.

Cell 65 is illustrated in detail in Figures 3, 4 and 5. The cell is formed of a block 70 of heat conducting material, such as aluminum. A passage 71 is drilled through block 70 to form a radiation path. Radiation transparent windows 73 and 74 are positioned in opposite ends of passage 71 and held in place by respective rings 75 and 76 which are secured to block 70 by screws 77. An annular gasket 78 is positioned between block 70 and window 73 to prevent leakage of fluid, and a ring 79 is positioned between window 73 and retaining ring 75. An annular gasket 80 is positioned between window 74 and block 70, and a ring 81 is positioned between window 74 and retaining ring 76. Inlet sample line 55 communicates with an inlet port 85 in block 70. A first elongated passage 86 is drilled in block 70 to form a continuation of port 85. A second passage 87 extends from the inner end of passage 86. Passage 87 is formed by drilling a hole in block 70 and blocking the outer portion thereof by a plug 90. A third elongated passage 91 is drilled in block 70 in communication with passage 87. The outer portion of passage 91 is blocked by a plug 92. A fourth passage 93 is drilled in block 70 in communication with passage 91. The outer portion of passage 93 is blocked by a plug 94. A fifth passage 95 is drilled in block 70 through passage 71 to communicate with passage 93. The outer portion of passage 94 is in communication with an outlet port 96 of the cell.

Block 70 is mounted on a base 97 of heat insulating material. The sides and top of block 70 are covered by plates 98 of heat insulating material. This insulating material forms a heat reservoir for the cell assembly. First and second openings are formed in block 70 to receive respective heating elements 100 and 101. A third opening is formed in block 70 adjacent heating element 101. A thermostat 102 is positioned in this third opening.

Figure 6:
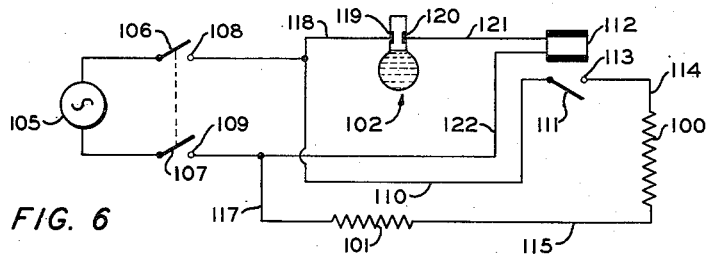
Figure 6 is an electrical circuit diagram of a first embodiment of the heating elements employed to maintain the temperature of the sample cell constant.

In Figure 6 there is shown a first embodiment of the electrical circuit associated with heating elements 100 and 101 and thermostat 102. Heating elements 100 and 101 are energized by a source of alternating current 105 which has the output terminals thereof connected to respective switches 106 and 107 that are mechanically coupled to one another. Switches 106 and 107 engage respective terminals 108 and 109 when closed. Switch terminal 108 is connected by a lead 110 to a switch 111 which is closed by a relay coil 112 being energized. Switch 111 engages a terminal 113 when closed. This terminal is connected by a lead 114 to the first terminal of heating element 100. The second terminal of heating element 100 is connected by a lead 115 to the first terminal of heating element 101. The second terminal of heating element 101 is connected by a lead 117 to switch terminal 109. Switch terminal 108 is also connected by a lead 118 to the first contact 119 of thermostat 102. The second contact 120 of thermostat 102 is connected by a lead 121 to the first terminal of relay coil 112. The second terminal of relay coil 112 is connected by a lead 122 to switch terminal 109. Thermostat 102 can be in the form of a mercury well arranged so that expansion of the mercury results in a circuit being completed between terminals 119 and 120 at a predetermined temperature.

The heating capacity of element 101 is considerably less than the heating capacity of element 100. Element 101 is positioned in close proximity to thermostat 102 so that thermostat 102 is actuated primarily by the heat generated by element 101. This arrangement results in a short time lag between the source of heat and the sensing means. Heating element 101 thus actuates the thermostat prior to the time that the thermostat would be actuated if heating element 100 alone were employed. This enables the temperature of block 70 to be maintained substantially uniform. The combined length of passages 86, 87, 91, 93 and 95 is such that the gas sample stream acquires the temperature of block 70 prior to entry into light passage 71. Thus, by maintaining the temperature of the sample material absolutely constant the accuracy of the measurement provided by the analyzer of Figure 2 is increased considerably.

In one particular application of this invention, heating element 100 was selected to provide 14 watts of heat and heating element 101 was selected to provide 3 watts. Elements of this size were sufficient to maintain the temperature of cell 70 at the desired value which was slightly above the normal temperature of the block. These values are illustrative of the desired ratio between the heating capacity of the two elements.

Figure 7:
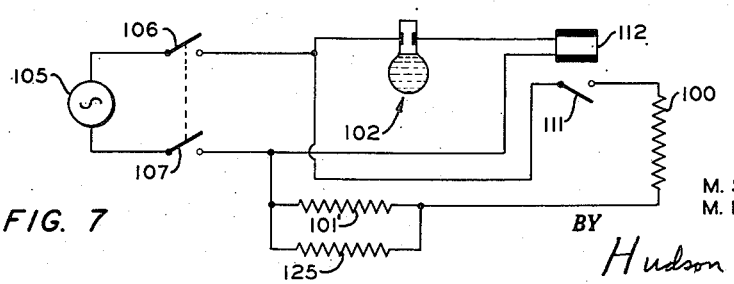
Figure 7 is a circuit drawing of a second embodiment of the electrical circuit.

In Figure 7 there is shown a second embodiment of the electrical heating system wherein the heating element 101′, which corresponds to element 101 of Figure 6, is shunted by a resistor 125. An arrangement of this sort is useful when it is desired to reduce the heating capacity of one of two identical heating elements. This is a practical arrangement which eliminates the need for purchasing different sized heating elements. Elements 100 and 101 can be identical and the reduced heating capacity of element 101 can be maintained by resistor 125 which reduces the current flow through element 101. Otherwise the circuit of Figure 7 is identical to the circuit of Figure 6.

While the invention has been described in conjunction with present preferred embodiments it should be evident that the invention is not limited thereto.

What is claimed is:

1. A sample cell for use in an optical analyzer comprising a block of heat conductive material having a first radiation transparent passage therethrough, means forming an elongated inlet fluid passage in said block between said first passage and a region exterior of said block, means forming an outlet passage in said block between said first passage and a region exterior of said block, a first heating element in thermal contact with said block, a second heating element in thermal contact with said block, said first and second heating elements being spaced from one another, the heating capacity of said second element being less than the heating capacity of said first element, a thermostat in thermal contact with said block adjacent said second element, and means to energize said first and second elements responsive to said thermostat.

2. The combination in accordance with claim 1 further comprising a mass of heat insulating material enclosing said block.

3. A sample cell for use in an optical analyzer comprising a block of heat conductive material having a first radiation transparent passage therethrough, means forming an elongated inlet fluid passage in said block between said first passage and a region exterior of said block, means forming an outlet passage in said block between said first passage and a region exterior of said block, a first electrical heating element in said block, a second electrical heating element in said block, said first and second heating elements being spaced from one another, the heating capacity of said second element being less than the heating capacity of said first element, a thermostat in thermal contact with said block adjacent said second element, a current source, and circuit means to energize said first and second elements from said current source responsive to said thermostat.

4. A sample cell for use in an optical analyzer comprising a block of heat conductive material having a first passage therethrough, a radiation transparent window positioned in each end of said first passage, a mass of heat insulating material enclosing said block, means forming an elongated inlet fluid passage in said block between said first passage and a region exterior of said block, means forming an outlet passage in said block between said first passage and a region exterior of said block, a first electrical heating element in said block, a second electrical heating element in said block, said first and second heating elements being spaced from one another, the heating capacity of said second element being less than the heating capacity of said first element, a thermostat in thermal contact with said block adjacent said second element, a current source, a relay to control the application of current from said source to said heating elements, and circuit means to energize said relay responsive to said thermostat.

5. The combination in accordance with claim 4 wherein said first and second heating elements are connected in series relationship with said current source through said relay, the resistance of said second element being less than the resistance of said first element.

6. The combination in accordance with claim 4 wherein said first and second heating elements are connected in series relationship with said current source through said relay, the resistance of said second element being substantially equal to the resistance of said first element, and a resistor connected in shunt with said second element.

7. Apparatus for use with optical analyzers comprising a conduit to supply a fluid to be analyzed, a rate-of-flow controller in said conduit, a pressure regulator in said conduit, a block of heat conductive material having a first radiation transparent passage therethrough, means forming an elongated inlet passage in said block between said first passage and a region exterior of said block in communication with the outlet of said conduit, means forming an outlet passage in said block between said first passage and a region exterior of said block, a first heating element in thermal contact with said block, a second heating element in thermal contact with said block, said first and second heating elements being spaced from one another, the heating capacity of said second element being less than the heating capacity of said first element, a thermostat in thermal contact with said block adjacent said second element, and means to energize said first and second elements responsive to said thermostat.

8. An analyzer comprising a conduit to supply a fluid to be analyzed, a rate-of-flow controller in said conduit, a pressure regulator in said conduit, a block of heat conductive material having a first radiation transparent passage therethrough, means forming an elongated inlet passage in said block between said first passage and a region exterior of said block in communication with the outlet end of said conduit, means forming an outlet passage in said block between said first passage and a region exterior of said block, a first heating element in thermal contact with said block, a second heating element in thermal contact with said block, said first and second heating elements being spaced from one another, the heating capacity of said second element being less than the heating capacity of said first element, a thermostat in thermal contact with said block adjacent said second element, and means to energize said first and second elements responsive to said thermostat.

References Cited in the file of this patent

UNITED STATES PATENTS

| | | |
|---|---|---|
| 1,519,555 | Ruben | Dec. 16, 1924 |
| 2,692,820 | Alway et al. | Oct. 26, 1954 |

OTHER REFERENCES

"Construction of a Dual Beam Heated Infrared Cell," by John T. Neu, from Journal of the Optical Society of America, vol. 43, No. 6, June 1953, pages 520, 521.